(12) United States Patent
Kozarekar

(10) Patent No.: US 7,712,560 B2
(45) Date of Patent: May 11, 2010

(54) HYBRID ELECTRIC VEHICLE POWERTRAIN

(75) Inventor: Shailesh Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 524 days.

(21) Appl. No.: 11/470,363

(22) Filed: Sep. 6, 2006

(65) Prior Publication Data

US 2008/0053723 A1   Mar. 6, 2008

(51) Int. Cl.
    *B60K 6/00*   (2007.10)
(52) U.S. Cl. ............. 180/65.21; 180/65.22; 180/65.225
(58) Field of Classification Search ............... 180/65.2, 180/65.3, 65.4, 65.6, 297, 65.1, 65.21, 65.22, 180/65.245, 65.225; 903/925, 951
    See application file for complete search history.

(56) References Cited

U.S. PATENT DOCUMENTS

| | | | |
|---|---|---|---|
| 5,562,565 A | 10/1996 | Moroto et al. | |
| 5,806,617 A | 9/1998 | Yamaguchi | |
| 5,931,757 A | 8/1999 | Schmidt | |
| 5,934,395 A * | 8/1999 | Koide et al. | 180/65.2 |
| 6,155,364 A | 12/2000 | Nagano et al. | |
| 6,278,195 B1 * | 8/2001 | Yamaguchi et al. | 290/40 A |
| 6,478,705 B1 | 11/2002 | Holmes et al. | |
| 6,527,659 B1 * | 3/2003 | Klemen et al. | 475/5 |
| 6,555,927 B1 * | 4/2003 | Suzuki et al. | 290/34 |
| 6,557,656 B2 | 5/2003 | Haniu et al. | |
| 6,612,963 B2 | 9/2003 | Minowa et al. | |
| 6,632,155 B1 | 10/2003 | Hoehn | |
| 6,793,034 B2 | 9/2004 | Raftari et al. | |
| 6,837,816 B2 | 1/2005 | Tsai et al. | |
| 6,852,053 B2 | 2/2005 | Nakano et al. | |
| 6,890,283 B2 | 5/2005 | Aoki | |
| 7,169,073 B2 * | 1/2007 | Schmidt et al. | 475/5 |

* cited by examiner

*Primary Examiner*—Paul N Dickson
*Assistant Examiner*—Brian Swenson
(74) *Attorney, Agent, or Firm*—David B. Kelley; Brooks Kushman P.C.

(57) ABSTRACT

A hybrid electric vehicle powertrain has motor-generator units and gear units assembled in an efficient configuration with an economy of space. Engine power and motor-generator power are distributed through split-power flow paths to front traction wheels of the vehicle.

10 Claims, 3 Drawing Sheets

HYBRID ELECTRIC VEHICLE POWERTRAIN

BACKGROUND OF THE INVENTION

1. Technical Field

The invention relates to a powertrain for a hybrid electric vehicle with front traction wheels.

2. Background of the Invention

A known hybrid electric vehicle powertrain system with two operating modes includes two motor-generators and two planetary gear units, which are adaptable particularly for rearwheel drive vehicle applications. One of the two motor-generators is situated between the two planetary gear units and the second motor-generator is located remotely from the engine at the torque output side of the second motor-generator. The two gear units establish either a split power input drive mode or a compound split power drive mode depending upon vehicle speed and other powertrain variables. Provision is made using selectively engageable clutches for shifting between the two drive modes at a zero speed point for one of the motor-generators. The clutches can be engaged and released in a synchronous fashion to establish an input split drive mode with a reverse drive and a forward drive range. When operating in this mode, one of the motor-generators acts as a motor and the other acts as a generator.

When a compound torque split mode is established, the powertrain may act in a high forward drive range. At that time, the motor-generators can operate in either a motoring mode or a generating mode as the vehicle speed changes.

The known two-mode hybrid electric vehicle powertrain is suitable for rearwheel drive vehicle applications in which the engine is located remotely from the torque output shaft, the torque output shaft being connected to rear vehicle traction wheels through a driveline in known fashion. If an arrangement of this type is configured for a front wheel drive vehicle applications, torque transfer gears in a three axis arrangement must be used to provide a torque flow path from the torque output shaft to the front traction wheels. A configuration of this type would present a problem for packaging the two motor-generators with the torque transfer gearing because the transverse dimension of the powertrain would be unacceptable, especially since the two motor-generators, even in the case of a rear wheel drive configuration, require a large transverse dimension.

The torque transfer gears for the front traction wheels, in a front wheel drive configuration, must be located at the torque output end of the gearing remotely from the engine, which is located at the opposite end of the gearing. It is this feature that results in greater packaging incompatibility for such a two-mode, front wheel drive hybrid vehicle powertrain compared to a conventional powertrain system. It also requires larger transverse dimensions of the vehicle chassis layout.

SUMMARY OF THE INVENTION

It is an objective of the invention to provide a hybrid vehicle system for a front wheel drive vehicle wherein a torque transfer unit, the motor-generators and the gearing are packaged efficiently in a powertrain without the space problems associated with the known two-mode power split and compound power split system. This is accomplished by using a long torque input shaft that delivers engine torque to the gearing and a torque output shaft that is concentrically located relative to the torque input shaft. The torque output shaft is connected to a torque transfer unit located between the gearing and the engine. The torque transfer unit is remotely situated relative to the gearing elements and the motor-generators in a three-shaft arrangement.

Engine torque is delivered through the elongated torque input shaft, which is connected drivably to a first of the gear units at a location that is remote from the engine. The rotor of the first motor-generator is connected drivably to a gear element of the first gear unit and is connected to the other gear unit through a friction clutch. The torque output elements of the first and second gear units are connected to the torque transfer unit at a location close to the engine.

PARTICULAR DESCRIPTION OF AN EMBODIMENT OF THE INVENTION

Figure 1:
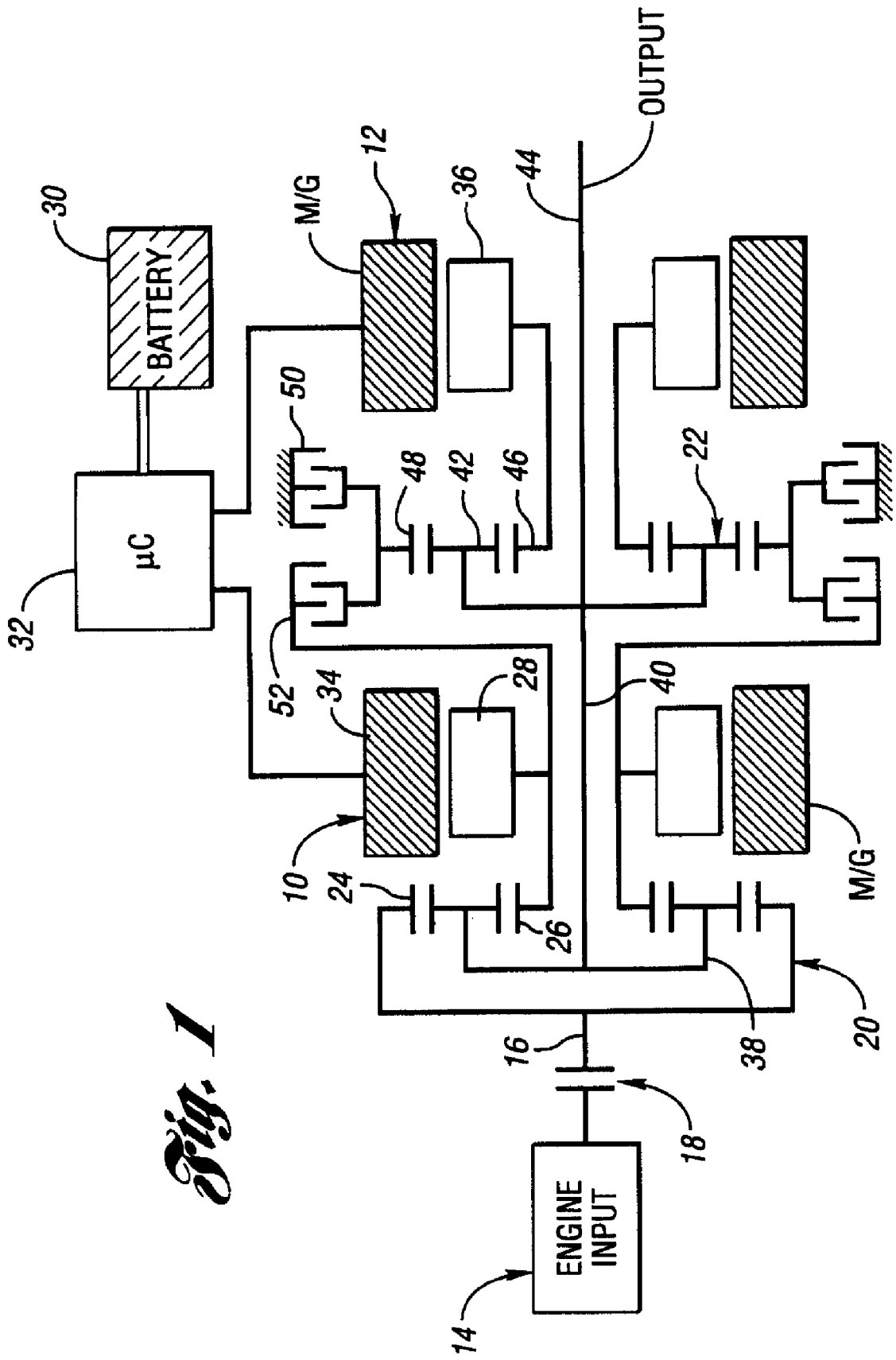
FIG. 1 is a schematic representation of a known two-mode rear wheel drive hybrid electric vehicle powertrain.

FIG. 1 is a schematic representation of a known two-mode input power split and compound power split hybrid electric vehicle powertrain that comprises two motor-generator units, as shown at 10 and 12. An engine 14 delivers driving power to a power input shaft 16 through a driver-controlled disconnect clutch 18. A first planetary gear unit 20 is situated between the engine 14 and the motor-generator unit 10. A second planetary gear unit 22 is situated between the motor-generator unit 10 and the motor-generator unit 12.

Power input shaft 16 is drivably connected to ring gear 24 of gear unit 20. Sun gear 26 of gear unit 20 is connected drivably to rotor 28 of motor-generator unit 10. High voltage battery system 30 is electrically coupled by a microprocessor controller 32 to stator 34 of the motor-generator unit 10. The microprocessor controller includes an inverter, an output sensor circuit and a central processor unit that executes control algorithms residing in memory in response to input variables. Likewise, the stationary stator for motor-generator unit 12 is electrically coupled to the battery system 30 through the controller 32, as indicated. The rotor for motor-generator unit 12 is shown at 36.

The carrier 38 of gear unit 20 is connected through central shaft 40 to the carrier 42 of the second planetary gear set 22. Central shaft 40 is connected to, or forms a part of, output shaft 44.

Sun gear 46 of the second planetary gear unit 22 is drivably connected to rotor 36. Ring gear 48 of the gear unit 22 is selectively braked to a stationary housing by friction brake 50. It is selectively coupled to sun gear 26 and rotor 28 by selectively engageable clutch 52.

The motor-generator units 10 and 12 may act either as a motor or as a generator depending upon the operating mode. In a first mode of operation, for example, motor-generator unit 10 at low vehicle speeds initially acts as a generator at the beginning of the first operating mode, and as a motor at a later stage of the first operating mode. At the beginning of the second operating mode, motor-generator unit 10 operates initially as a generator. As the vehicle speed increases in the second operating mode, motor-generator unit 10 begins to act as a motor.

At the beginning of the first operating mode, motor-generator unit 12 acts as a motor. As the vehicle speed increases with the powertrain operating in the second operating mode, motor-generator unit 12 acts as a generator.

A first operating mode of the powertrain shown in FIG. 1 provides a forward speed range and a reverse speed range. This is done by engaging brake 50 and releasing brake 52.

A split input torque delivery is established as the first planetary gear unit 20 functions as a torque splitter. It does not have a reaction element at this time. The planetary gear unit 22, however, has a reaction element and functions as a torque multiplier. The high forward drive range is obtained by releasing the brake 50 and applying the clutch 52, which establishes a compound split drive mode with gear units 20 and 22 operating in a differential mode. A neutral state is established by releasing both clutch 52 and brake 50. Carrier torque from gear unit 20 and from gear unit 22 is delivered to the power output shaft 44.

Figure 2:
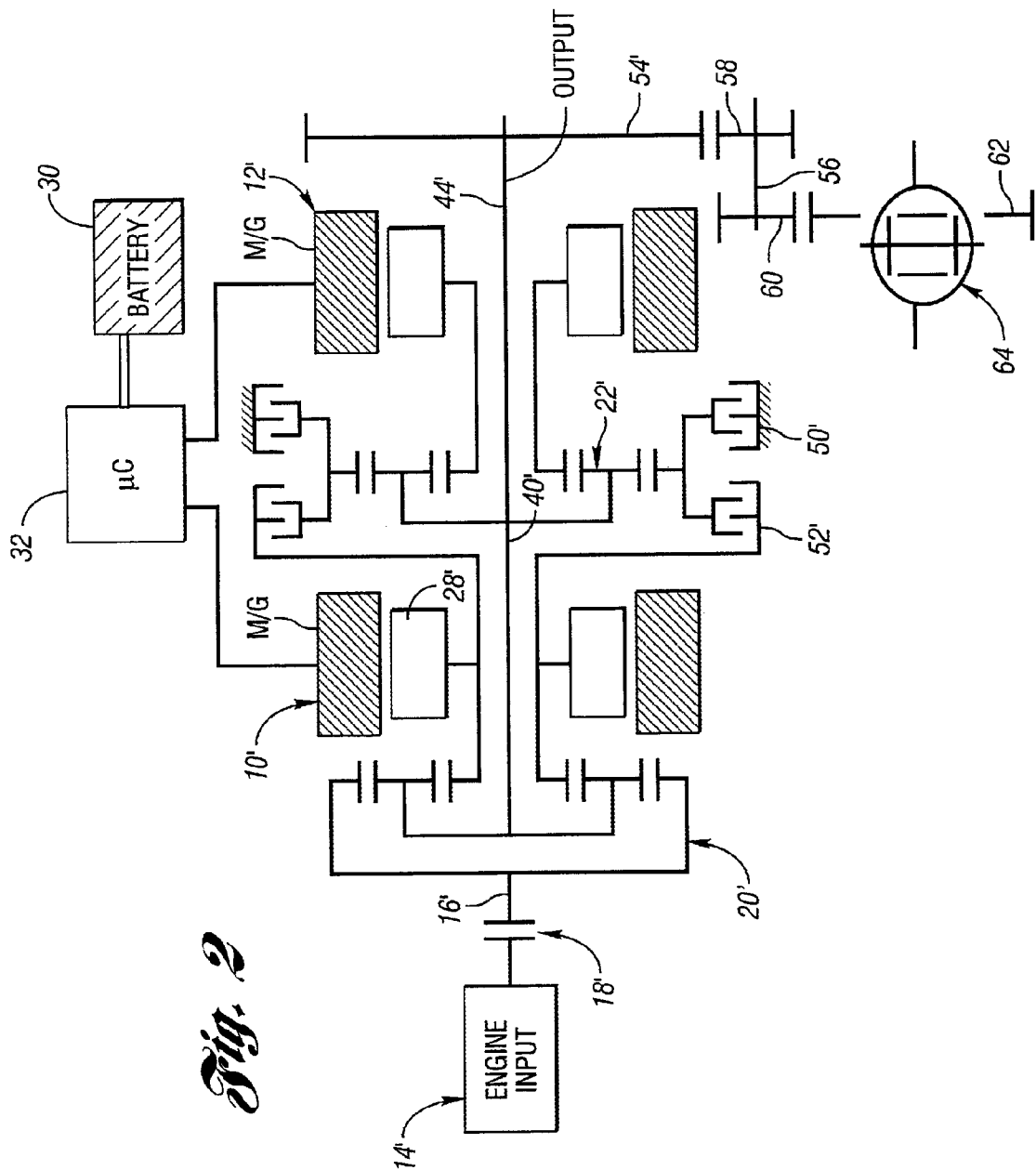
FIG. 2 is a schematic representation of a powertrain of the type shown in FIG. 1 wherein the motor-generators and planetary gearing are adapted for a front wheel drive vehicle by using torque transfer gearing located at the torque output side of the planetary gearing.

In a rearwheel drive powertrain, the power output shaft 44 would be connected through a driveshaft and a rear axle differential mechanism to rear traction wheels. In order to adapt the hybrid powertrain of FIG. 1 to a front wheel drive configuration, it would be necessary to provide a front wheel drive differential and axle mechanism and a transfer drive gear system, including a countershaft that is transversely offset with respect to the power output shaft 44. Such an arrangement is illustrated in FIG. 2. In FIG. 2, the elements of the powertrain that correspond to elements of the powertrain of FIG. 1 have been designated by reference numerals that are the same as the reference numerals used in FIG. 1, although prime notations are added.

In FIG. 2, a torque transfer drive gear 54' is connected drivably to power output shaft 44'. A countershaft 56 has countershaft gear elements 58 and 60, which engage, respectively, gear 54 and gear 62 on a differential-and-axle assembly 64. In a front-wheel drive configuration, as well as in an all-wheel drive configuration, torque would be delivered to the traction wheels from the differential-and-axle assembly 64.

In the configuration of FIG. 2, it is necessary to locate differential-and-axle assembly 64 and the torque transfer countershaft gearing with a large transverse separation between the axis of the differential axle assembly 64 and the axis of the power output shaft 44'. This is necessary in order to provide a clearance between the elements of the gear sets 21' and 22' and the elements of the motor-generator gear units 10' and 12'. This presents a major packaging problem for a front wheel drive automotive vehicle since the transfer gears must be placed at the remote end of the gearing and motor-generator assembly with respect to the engine.

Figure 3:
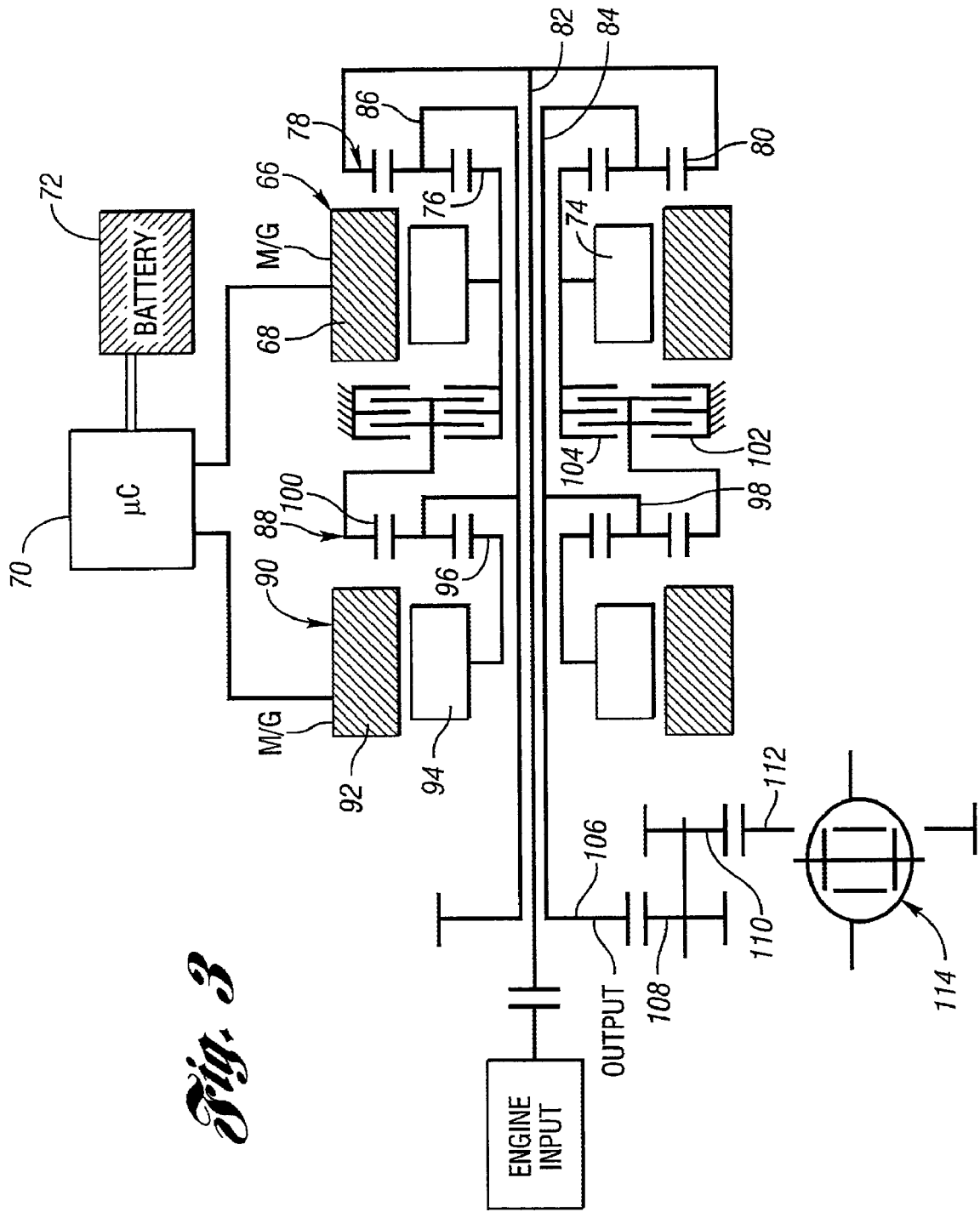
FIG. 3 is a schematic representation of a powertrain that incorporates the present invention.

In contrast to the design of FIG. 2, the configuration of the present invention illustrated in FIG. 3 includes torque output elements of the powertrain that are located adjacent the engine and near the torque input side of the gearing and motor-generator assembly. Further, the positions of the motor-generator units are interchanged and the positions of the planetary gear units are interchanged. Likewise, the power input shaft is elongated and extended through the motor-generator units and the planetary units to the side of the powertrain that is remotely situated with respect to the engine.

In FIG. 3, a first motor-generator unit 66 has a stator 68 electrically coupled to a microprocessor 70 corresponding to the microprocessor 32 of FIG. 1. A battery system 72 corresponds to the battery system 30 of FIG. 1. A rotor 74 of motor-generator gear unit 66 is connected to sun gear 76 of a first planetary gear unit 78. Ring gear 80 of planetary gear set 78 is connected to the end of the elongated torque input shaft 82. An elongated torque output sleeve shaft 84 surrounds input shaft 82, as shown in FIG. 3. Shaft 84 is connected to carrier 86 of the first planetary gear unit 78.

A second planetary gear unit 88 is located between motor-generator unit 68 and a second motor-generator unit 90. A stator 92 of motor-generator unit 90 is electrically coupled to the controller 70. A rotor 94 of the second motor-generator unit 90 is connected to sun gear 96 of the second planetary gear unit 88. Carrier 98 of the second planetary gear unit 88, like carrier 86 of planetary gear unit 78, is connected to the power output sleeve shaft 84.

Ring gear 100 of the second planetary gear unit 88 is selectively braked by friction brake 102. Ring gear 100 also is selectively clutched to rotor 74 of the first motor-generator unit 66 by friction clutch 104, which may be located radially inward of brake 102, as shown in FIG. 3.

The function of the motor-generator units and the gear sets of FIG. 3 are the same as the corresponding functions of the power split system of FIG. 1. Motor-generator unit 10 of FIG. 1 corresponds to motor-generator unit 90 of FIG. 3. The function of motor-generator unit 12 of FIG. 1 corresponds to the motor-generator unit 66 of FIG. 3. Likewise, clutch 52 and brake 50 of FIG. 1 correspond, respectively, to clutch 104 and brake 102 of FIG. 3.

It is possible to provide an efficient packaging configuration for a front-wheel drive, two-mode, power split powertrain by locating the torque output gear, as shown at 106, between the engine and the second motor-generator unit 90. The gear 106 engages the countershaft gear 108. The countershaft output gear 110 drives differential-and-axle assembly gear 112, which serves as an input gear for the differential-and-axle assembly 114. Because of the strategic location of the power output gear and the differential-and-axle assembly for the configuration of FIG. 3, a large degree of flexibility in the packaging of the elements of the powertrain is made available in a chassis design for a front-wheel drive vehicle, as an all-wheel drive vehicle.

Although a particular embodiment of the invention has been disclosed, it will be apparent to persons skilled in this art that modifications may be made without departing from the scope of the invention. All such modifications and equivalents thereof are intended to be covered by the following claims.

What is claimed:

1. A hybrid electric vehicle powertrain for a front wheel drive vehicle comprising an engine, a pair of motor-generator units and a pair of simple planetary gear units;
    the motor-generator units, the gear units and the engine being disposed on a common axis and defining power flow paths from the engine and from the motor-generator units to front traction wheels for the vehicle, one gear unit being disposed between the motor-generator units and the other gear unit being disposed at an axial end of the powertrain remote from the engine; and
    power transfer gearing axially located directly between the engine and one of the motor-generator units on an axis that is offset from the common axis.

2. The hybrid electric vehicle powertrain set forth in claim 1 wherein the engine has an engine crankshaft axis coinciding with the common axis.

3. The hybrid electric vehicle powertrain set forth in claim 1 wherein the gear units include an elongated power input shaft adapted to be drivably connected to the engine, the power input shaft extending concentrically through the motor-generator unit remote from the engine and the motor-generator gear unit proximate to the engine.

4. The hybrid electric vehicle powertrain set forth in claim 3 wherein the gear units have a common power output shaft drivably connected to a torque input gear of the power transfer gearing.

5. The hybrid electric vehicle powertrain set forth in claim 4 wherein the common power output shaft is a sleeve shaft surrounding the elongated power input shaft on the common axis.

6. A hybrid electric vehicle powertrain comprising an engine, a pair of motor-generator units and a pair of simple planetary gear units;

the motor-generator units being disposed on a common axis and defining power flow paths from the engine and from the motor-generator units to traction wheels for a vehicle;

one gear unit being located on the common axis between the motor-generator units and the other gear unit being located on the common axis at one end of the gear units and the motor-generator units remote from the engine; and power transfer gearing located between the engine and the motor-generator units on an axis that is offset from the common axis at the opposite end of the gear units and motor-generator units; and a clutch connecting an element of the one gear unit and an element of the other gear unit, and a brake for braking an element of the one gear unit, the clutch and the brake being located so that one is radially displaced relative to the other whereby the axial length of the powertrain is reduced.

7. The hybrid electric vehicle powertrain set forth in claim 6 wherein the engine has an engine crankshaft axis coinciding with the common axis.

8. The hybrid electric vehicle powertrain set forth in claim 7 wherein the gear units include an elongated power input shaft adapted to be drivably connected to the engine, the power input shaft extending concentrically through the motor-generator units from one end of the powertrain remote from the engine to an end of the powertrain proximate to the engine.

9. The hybrid electric vehicle powertrain set forth in claim 8 wherein the gear units have a common power output shaft drivably connected to a torque input gear of the power transfer gearing.

10. The hybrid electric vehicle powertrain set forth in claim 9 wherein the common power output shaft is a sleeve shaft surrounding the elongated power input shaft on the common axis.

\* \* \* \* \*